US006421218B1

(12) United States Patent
Vo et al.

(10) Patent No.: US 6,421,218 B1
(45) Date of Patent: Jul. 16, 2002

(54) OVERVOLTAGE PROTECTOR

(75) Inventors: Chanh C. Vo, Arlington; John J. Napiorkowski, Irving; Boyd G. Brower, Keller, all of TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 09/534,670

(22) Filed: Mar. 24, 2000

(51) Int. Cl.[7] .................................................. H02H 1/00
(52) U.S. Cl. ....................................................... 361/117
(58) Field of Search .................................. 361/117–119

(56) References Cited

U.S. PATENT DOCUMENTS 5,388,023 A * 2/1995 Boy et al. ................... 361/119
5,909,349 A * 6/1999 Brower et al. .............. 361/117
5,999,393 A * 12/1999 Brower ....................... 361/117
6,172,865 B1 * 1/2001 Boy et al. ................... 361/119

* cited by examiner

*Primary Examiner*—Adolf Deneke Berhane
*Assistant Examiner*—Pia Tibbits

(57) ABSTRACT

An overvoltage protector assembly utilizes a gas tube having an electrically conductive terminal and an electrically conductive end cap for being selectively brought into electrical contact with the terminal to divert surges to ground. A toroidal non-conductive element having a central hole is disposed between an end cap and the terminal of the gas tube. A fusible element formed of a fluxed solder pellet is also disposed between the end cap and the terminal of the gas tube. The end cap includes at least one aperture and a raised projection on its outer surface so that axial forces applied by a spring clip are centrally applied to the end cap. Molten solder flows through the central hole in the non-conductive element and the aperture in the end cap when the overvoltage protector assembly overheats so that the end cap and the terminal are in electrical contact.

22 Claims, 8 Drawing Sheets

OVERVOLTAGE PROTECTOR

BACKGROUND

The present invention is directed to overvoltage protectors of the type for use in telecommunication lines. In one aspect, the invention relates to a gas tube based protector that is operable without the need for a backup varistor or other device.

Overvoltage protectors are known that use a gas tube as the primary means for diverting voltage surges to ground and also use a second device, such as a metal oxide varistor (MOV), as a backup protection device. The backup protector is intended to become operable in the event of or to prevent a failure in the gas tube, as might occur from a gas leak from the tube. Arrangements of this type are described in U.S. Pat. Nos. 5,909,349 and 5,388,023. The MOV is intended to become operable at higher voltages than the gas tube so that the gas tube will operate to ground a surge rather than the MOV under normal circumstances.

Unfortunately, there are drawbacks to using an MOV as a backup device. First, it may be possible for a defective MOV to be a short rather than act as a varistor. Also, the use of MOVs drives up the cost of making the overvoltage protector.

U.S. Pat. No. 5,388,023 teaches placement of a cylindrical non-conductive disk, rather than an MOV, between the end cap and the end of the gas tube in order to ensure that there is no contact between the end caps and the outside body of the gas tube. When the protector assembly becomes overheated, as in the case of a malfunction, solder disks near the axial ends of the gas tube melt, and it is intended that a spring clip will urge the end caps against the end terminals of the gas tube, thereby intentionally shorting out the protector assembly and rendering it inoperable. This is intended to provide a "fail-safe" mode for the protector assembly. In practice, however, the mass of the molten solder may not flow adequately and continue to prevent the end caps from contacting the end terminals of the gas tube, thereby preventing the assembly from providing the fail-safe protection.

Other problems with conventional protector assemblies stem from the fact that spring clips used to secure the end caps against the ends of the gas tube can apply forces to the caps unevenly, thereby causing the caps to tilt or become seated improperly. The outer axial surface of the cap is usually flat, and the portions of the spring clips that engage them are also typically flat. However, the solder pellet and MOV located inside of the cap have a smaller diameter than that of the cap, allowing the cap room to move about. Uneven application of axial forces by the spring clip presents a small possibility that the cap could contact conductive portions of the gas tube and essentially short out the protector assembly prematurely.

SUMMARY OF THE INVENTION

The present invention provides an overvoltage protector assembly that utilizes a gas tube to divert surges to ground. An exemplary protector assembly is described that includes a gas tube that is the primary and only mechanism for transmitting excessive voltage to ground.

The protector assembly has several features that ensure reliability of the gas tube as a protective element. A toroidal non-conductive element, such as a glass, ceramic, or plastic insert, is disposed between the end cap and the axial ends of the gas tube. A fusible element formed of a fluxed solder pellet is also located between the end cap and the axial ends of the gas tube. The end cap provides includes a number of apertures therein and a raised projection on its outer surface. The spring clip of the protector element engages the projection of the cap so that axial forces applied by the clip are centrally applied to the cap and not unevenly distributed on different portions of the cap.

In the event of a failure in the gas tube that would result in melting of the fluxed solder pellet, the molten solder will adhere to the surfaces of the end cap and the non-conductive element due to the presence of the flux in the solder. Solder from the pellet is transmitted through the apertures of the end caps as well as the hole in the toroidal non-conductive element. As a result, the mass of the solder that provided for a gap between the end caps and the end conductors of the gas tube essentially disappears, and the spring clip urges the end caps against the conductors. Molten solder that flows into the hole in the toroidal element will also be transmitted to the end conductors of the gas tube thereby providing an electrical contact between the end cap and the conductors of the gas tube.

The protector assembly also uses end caps having raised projections that engage the tangs of a securing clip. In contrast to the prior art assemblies, this arrangement ensures that the force applied to the caps by the clip is centralized and does not result in the end caps being tilted onto the ends of the gas tube, thereby resulting in a premature short-out condition.

The improvements of the present invention help provide an effective and reliable protector assembly that does not require an MOV back up device. The devices of the present invention also reduces the costs associated with creating protector assemblies and improve overall reliability.

DETAILED DESCRIPTION OF THE INVENTION

Figure 1:
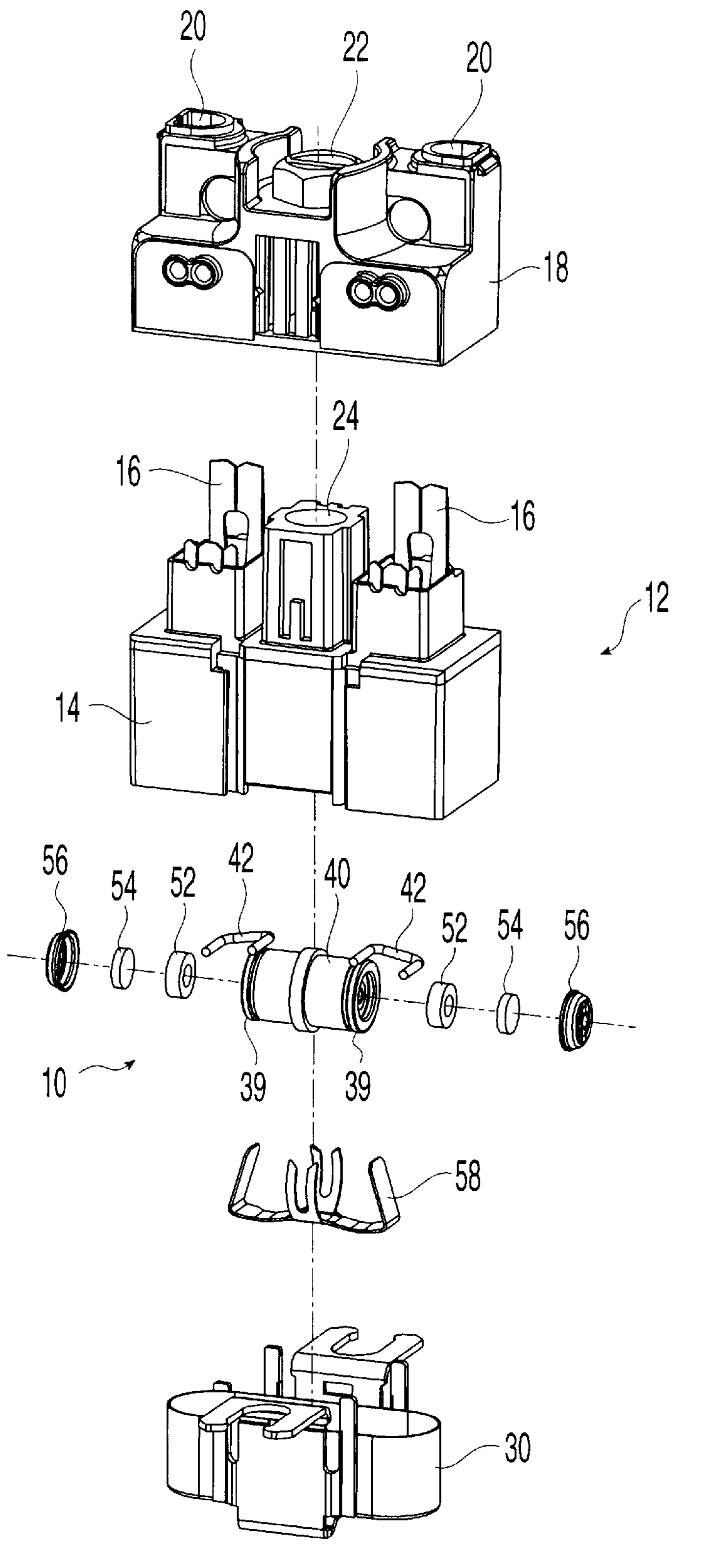
FIG. 1 is an exploded perspective view of a protector module application that incorporates an exemplary protector assembly constructed in accordance with the present invention.

With reference to FIG. 1, an exemplary protector module 12 is shown with a protector assembly 10 contained within. The protector module 12 is commonly referred to as a station protection module and is used in telephone network interface devices (NIDs). The module 12 is placed on the side of a telephone subscriber's residence to protect the telephone lines and equipment at the subscriber from being damaged by surges caused, for example, by lightning strikes. The particular construction of the protector assembly 10 is exemplary only and can be adapted for use in other telecommunications-related applications and packaging, as are known in the art.

The module 12 generally includes a plastic housing 14 from which electrically conductive insulation displacement terminal tines 16 extend. The tines 16 are used for the attachment and affixation of telephone lines (not shown) to the module 12. If desired, stud and nut terminals may be used in place of the insulation displacement terminal tines 16 shown.

A stuffer box 18 fits over the housing 14. The stuffer box 18 has apertures 20 through which the tines 16 are disposed and a securing screw 22 that can be secured within threaded hole 24 on the housing 14 to affix the stuffer box to the housing 14.

The tines 16 are electrically connected to leads 42. The leads 42 are, in turn, connected to the two end, or line, electrodes 39 of gas tube element 40 of protector assembly 10. The protector assembly 10 is in contact with a grounding box 30 that slides into the lower end of the housing 14. The assembly 10 is intended to conduct any surges to the grounding box 30 as the grounding box 30 is connected to earth ground on installation of the NID. The components of the module 12 are typically potted to help secure them all together.

Referring now also to FIGS. 2–5, it can be seen that the gas tube protector element 40 is generally cylindrical in shape and has non-conductive elements 52 located on either axial end. The non-conductive elements 52 are toroidal in shape and, therefore, have a central hole 53 disposed therein. Solder pellets, shown schematically as discs 54, are disposed outside of the non-conductive elements 52, and are covered by end caps 56. These components are held against the axial ends 60, 62 of the gas tube 40 by a clip 58. The non-conductive elements 52 may be formed of glass, ceramic, or a hardened plastic having a high resistance to melting. Although not shown, the solder pellets 54 and the non-conductive elements 52 could be reversed. That is, the non-conductive elements could be located on the outside, next to the end caps 56, rather than on the inside next to the axial ends of the gas tube 40. It is preferable, however, that the solder pellets 54 are next to gas tube 40.

The solder pellets 54 are flat, cylindrical, fusible elements that are composed of a fusible alloy and impregnated with flux. A currently preferred alloy is 60% SN and 40% Pb, although other suitable alloys may be used. The pellets 54 are preferably fabricated by using a powder metallurgy process of pressing and sintering. In a current preferred embodiment, the pellets 54 may also include an additional amount of solid, non-corrosive, non-conductive rosin flux. The additional amount used for the configuration shown is less than 15%, preferably less than 10%, and most preferably about 8%. The presence of the flux in the pellets 54 assists the solder to flow and helps ensure that the solder making up the pellets 54 will adhere to metal surfaces on the end cap 56 after being melted. Because the solder adheres to these surfaces, the solder is less likely to prevent the cap 56 and the body of the gas tube 40 from contacting one another as designed.

The gas tube protector element 40 has a central electrode 64 that surrounds the circumference of the tube 40. Two end electrodes 66, 68 (shown in FIG. 4) are disposed within the tube 40 and are located at either axial end of the tube 40. Because there are three separate electrodes, or conductive elements, the gas tube protector element 40 is often referred to as a "three-element" gas tube. If not apparent from the drawings, it is noted that the end electrodes 66, 68 (visible in FIG. 4) are in electrically conductive communication with the end terminals 39 of the gas tube 40.

Figure 2:
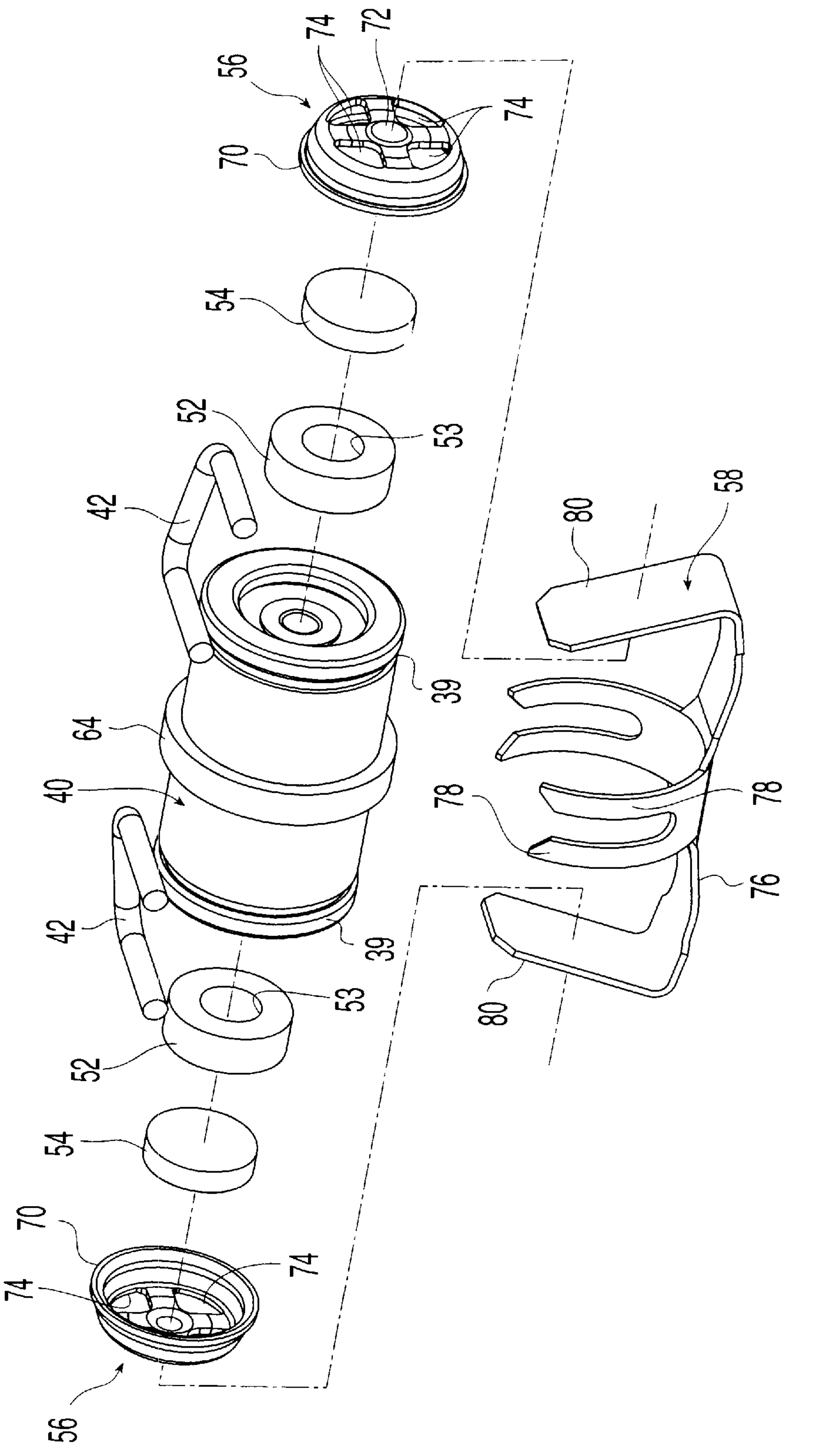
FIG. 2 is an exploded view of portions of the protector assembly used in the module shown in FIG. 1.
Figure 5:
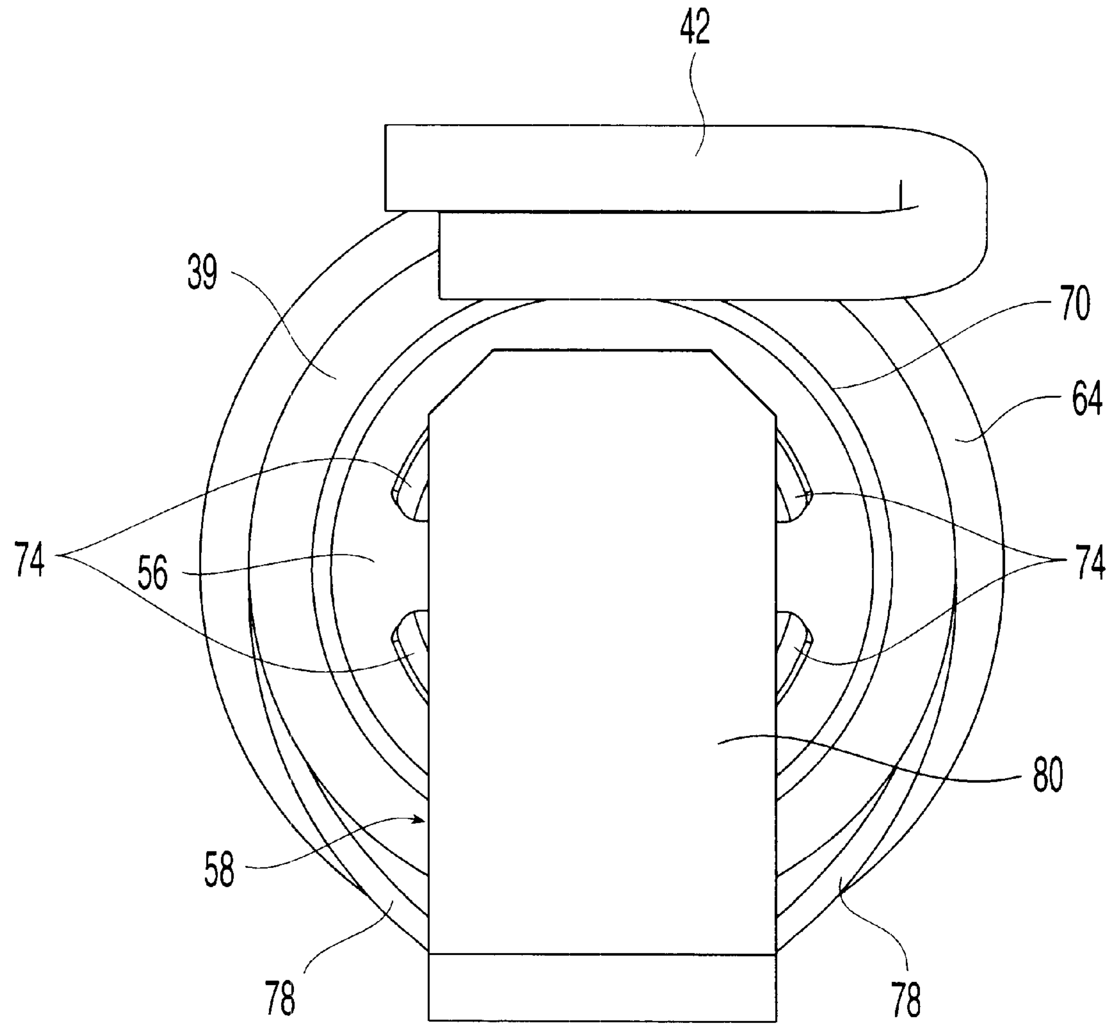
FIG. 5 is an end view of the protector assembly portions shown in FIGS. 2–4.

The end caps 56 are formed of electrically conductive material. They are dome shaped and have a peripheral flange 70. The central domed portion of each cap 56 contains a raised projection 72. The projection 72 extends outwardly from the upper surface of the cap 56 at least 0.007 mm. It is preferred that the projection extend from 0.010 to 0.026 mm from the upper surface of the cap 56. In addition, as FIGS. 2 and 5 show, the caps 56 each have a number of apertures 74 cut therein.

Figure 3:
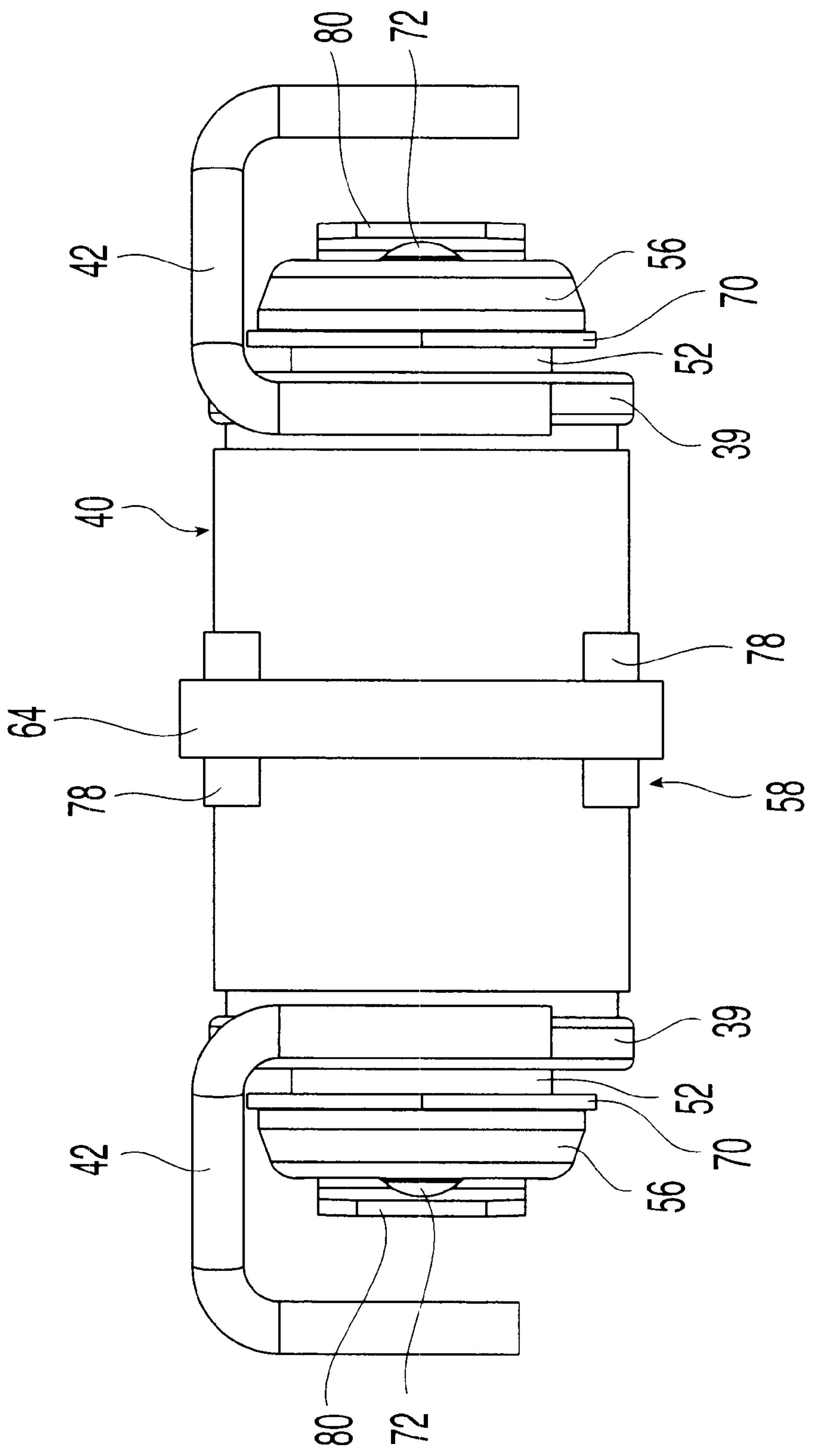
FIG. 3 is a top view of the protector assembly portions illustrated in FIG. 2.
Figure 4:
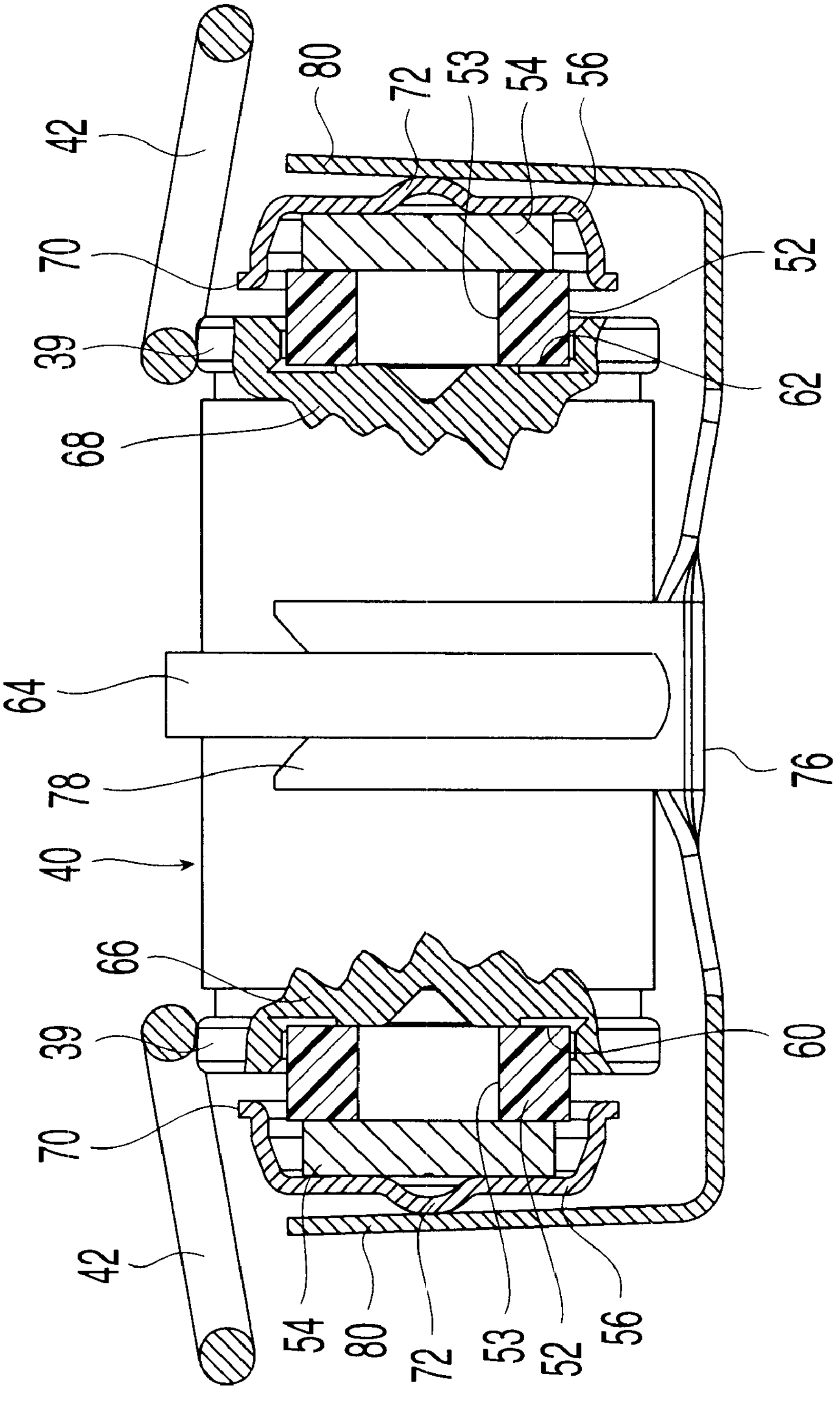
FIG. 4 is a side, cross-sectional view of the protector assembly portions shown in FIG. 3.

The clip 58 is of a design known in the art having a longitudinal central spine 76 and arcuate central gripping portions 78 that extend upwardly from the spine 76. As shown in FIGS. 3, 4, and 5, the gripping portions 78 can be snapped onto the body of the gas tube 40 to engage the central electrode 64 that surrounds the central portion of the gas tube 40. Either end of the spine 76 of the clip 58 has a tang 80 that contacts the raised projection 72 of an end cap 56 when the clip 58 is snapped on to the tube 40.

The use of the fluxed solder pellets 54 in conjunction with the toroidal-shaped non-conductive elements 52 and the end caps 56 is advantageous and helps to ensure the reliability of the protector assembly 10. It is intended and desired that when the protector assembly 10 overheats and the solder pellets 54 melt, the end caps 56 should be brought into contact with the end terminals 39 of the gas tube 40. This is a "fail safe" feature that will essentially short out the protector assembly 10 rendering it inoperable and grounding it. The apertures 74 in the end caps 56 allows the molten solder to flow through them, providing an alternative path to that offered by the gap between the flanged edges 70 and the end terminals 39.

A desired melting of the solder is also promoted by the presence of the holes 53 within the non-conductive elements 52. The molten solder can be transmitted through the holes 53 and ultimately contact the electrodes 66, 68, thereby completing an electrical connection between the electrodes 66, 68 and the end caps 56.

Figure 6:
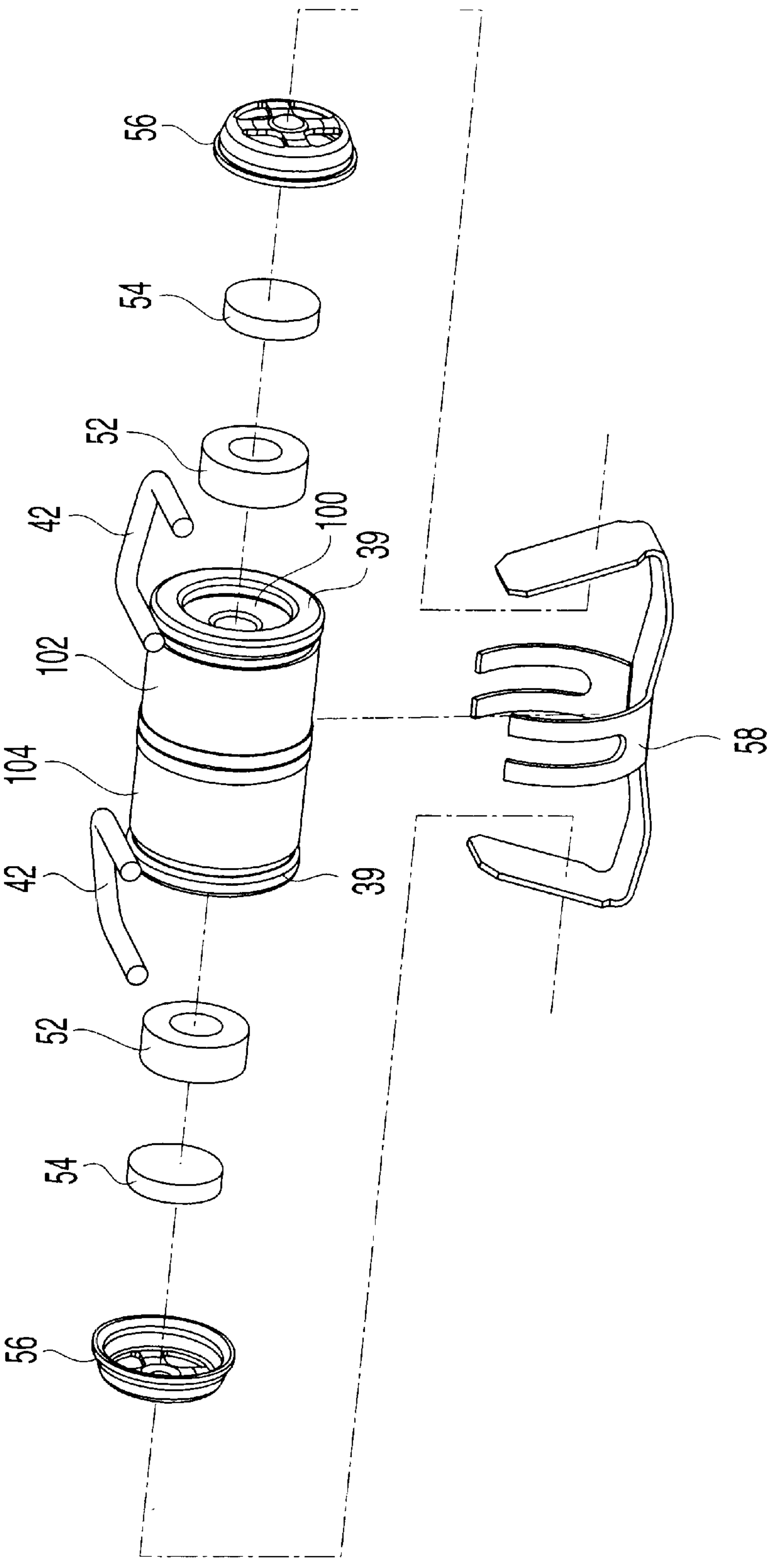
FIG. 6 illustrates an alternative embodiment for a protector assembly constructed in accordance with the present invention wherein the gas tube protector element is made up of a pair of two-element gas tubes.

The present invention is also applicable to two-element gas tube-type protector devices that lack a central electrode. FIG. 6 depicts an exemplary protector assembly 100 that is constructed and operates, in most respects, the same as the protector assembly 10 described earlier. For clarity, like reference numerals are used for like components. Two separate "two element" gas tubes 102, 104 have been placed in an end-to-end relation to make up a single protector element 106.

Figure 7:
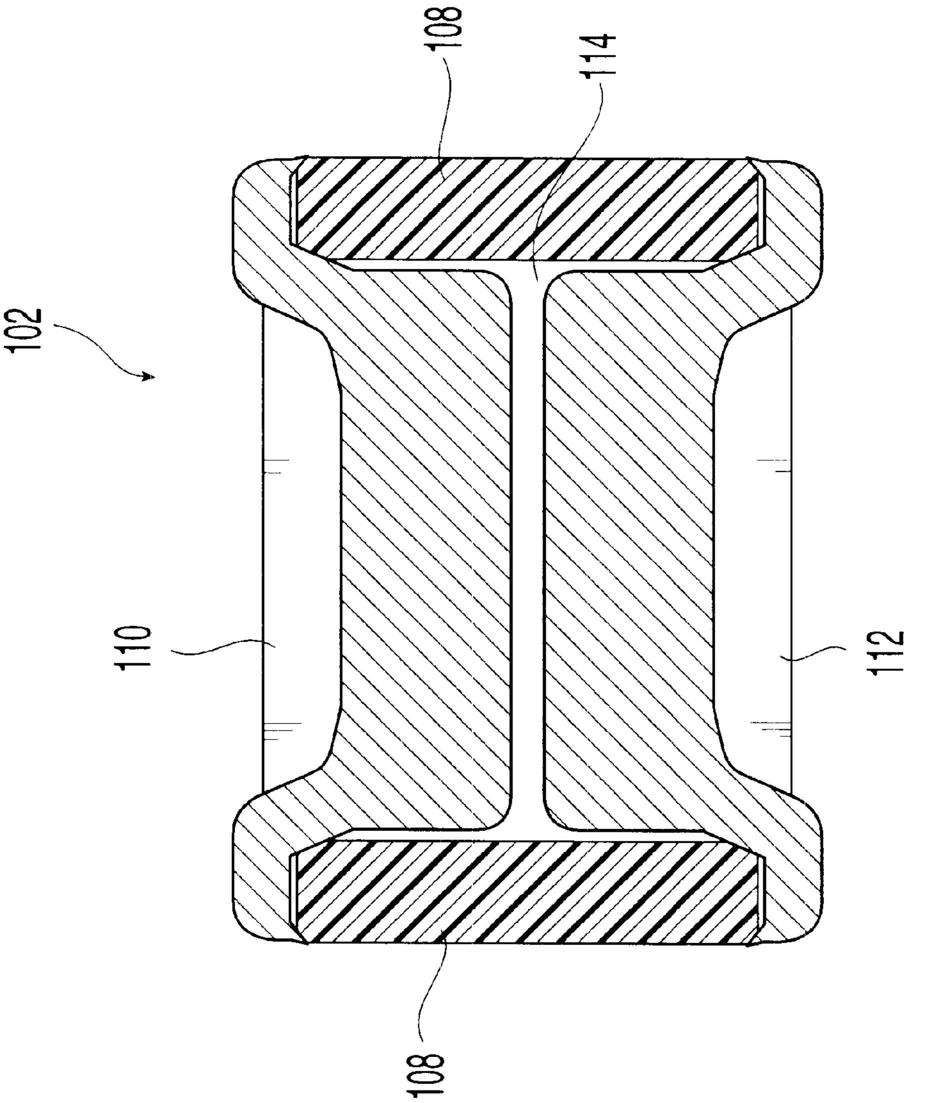
FIG. 7 is a cross-sectional view of a single two-element gas tube.

FIG. 7 is a cross-sectional view of one of the two-element gas tubes 102, although it should be understood that the gas tube 104 will have the same construction. The gas tube 102 has a cylindrical, non-conductive housing 108 with a first end terminal 110 and a second end terminal 112 affixed to either axial end of the housing 108. The two terminals 110, 112 are made of conductive material. These components are sealed to enclose a gas chamber 114.

As FIG. 6 shows, the second terminal 112 of the first gas tube 102 contacts and adjoins the first terminal 110 of the second gas tube 104, thereby forming a single conductive portion that provides the same function as the central electrode 64 of gas tube protector element 40. The two gas tubes 102, 104 are secured to one another using the spring clip 58.

Figure 8:
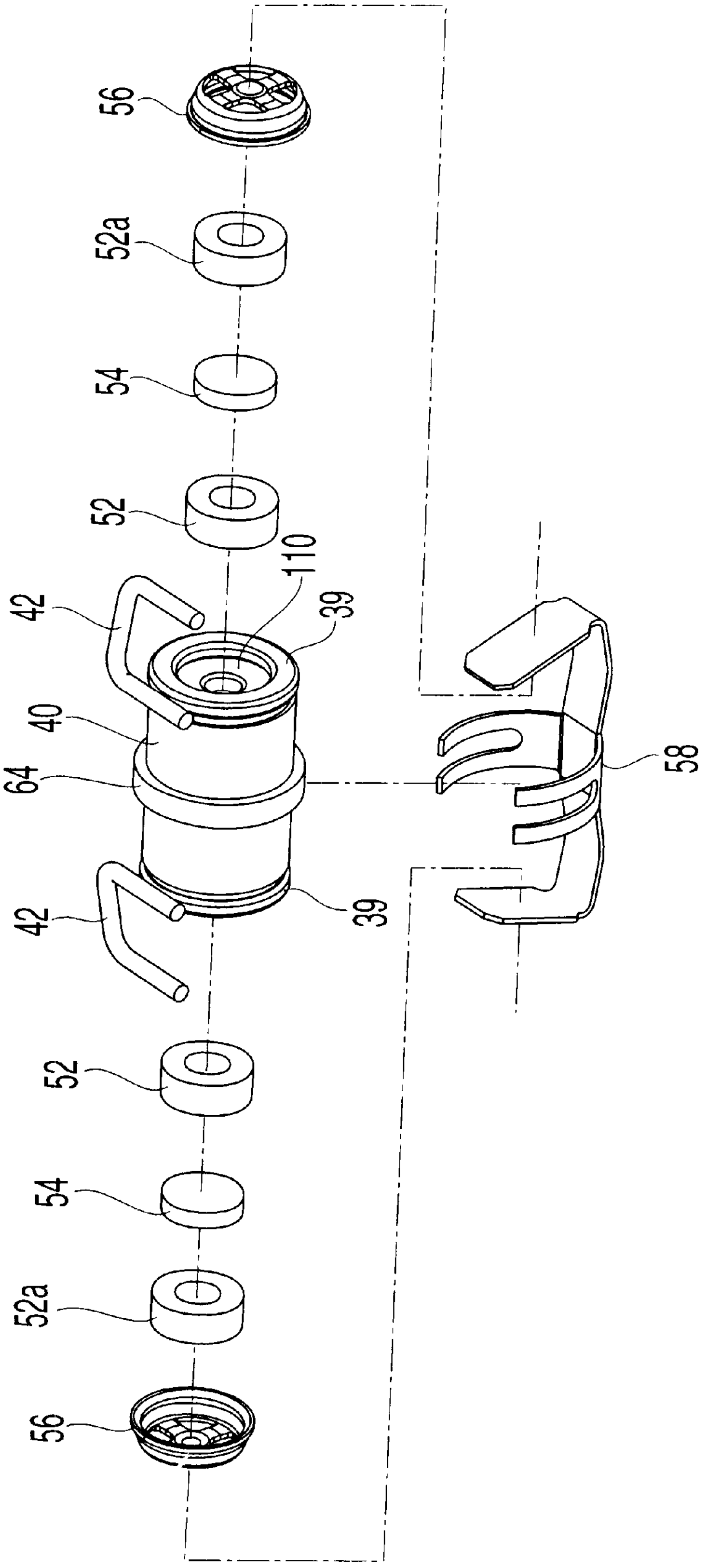
FIG. 8 illustrates an alternative embodiment for a protector assembly constructed in accordance with the present invention wherein the protector has two toroidal non-conductive elements on either side of the gas tube.

FIG. 8 illustrates an alternative embodiment to that shown in FIG. 2. Rather than having a single non-conductive element 52 on either side of the gas tube, a second non-conductive element 52*a* is placed between the end cap 56 and the solder pellets 54.

While the invention has been shown or described in only some of its forms, it should be apparent to those skilled in the art that it is not so limited, but is susceptible to various changes within departing from the scope of the invention.

What is claimed is:

1. A protector assembly comprising:

a gas tube protector element having an electrically conductive terminal;

an electrically conductive end cap adapted for being selectively brought into contact with the terminal to ground the gas tube protector element;

a fusible solder pellet disposed between the end cap and the terminal; and a toroidal non-conductive element disposed between the end cap and the terminal;

wherein the non-conductive element has a central hole to permit molten solder from the solder pellet to flow therethrough when the protector assembly overheats so that the end cap and the terminal are in electrical contact.

2. The protector assembly of claim 1 wherein the solder pellet is further disposed between the non-conductive element and the end cap.

3. The protector assembly of claim 1 wherein the solder pellet is further disposed between the terminal and the non-conductive element.

4. The protector assembly of claim 1 wherein the end cap has at least one aperture to permit molten solder from the solder pellet to flow therethrough when the protector assembly overheats.

5. The protector assembly of claim 1 further comprising an electrically conductive spring clip in contact with the gas tube protector element and the end cap and wherein the end cap comprises a raised projection extending outwardly therefrom for engaging the spring clip so that axial forces are applied to the end cap by the spring clip.

6. The protector assembly of claim 1 further comprising an electrically conductive spring clip in contact with the gas tube protector element and the end cap, the spring clip having a tang that contacts the end cap and urges the end cap axially in the direction of the terminal.

7. The protector assembly of claim 1 wherein the non-conductive element is made of a material selected from the group consisting of ceramic, glass, and plastic.

8. The protector assembly of claim 1 wherein the solder pellet comprises about 8% solid, non-corrosive, non-conductive rosin flux.

9. A protector assembly comprising:

a gas tube protector element having an electrically conductive terminal;

an electrically conductive end cap adapted for being selectively brought into contact with the terminal to ground the gas tube protector element;

a fusible solder pellet disposed between the end cap and the terminal; and a toroidal non-conductive element disposed between the end cap and the terminal;

wherein the non-conductive element and the end cap each has at least one aperture to permit molten solder from the solder pellet to flow therethrough when the protector assembly overheats.

10. The protector assembly of claim 9 wherein the solder pellet is further disposed between the non-conductive element and the end cap.

11. The protector assembly of claim 9 wherein the solder pellet is further disposed between the terminal and the non-conductive element.

12. The protector assembly of claim 9 wherein the non-conductive element has a central hole to permit molten solder from the solder pellet to flow therethrough when the protector assembly overheats so that the end cap and the terminal are in electrical contact.

13. The protector assembly of claim 9 further comprising an electrically conductive spring clip in contact with the gas tube protector element and the end cap and wherein the end cap has a raised projection extending outwardly therefrom for engaging the spring clip so that axial forces are applied to the end cap by the spring clip.

14. The protector assembly of claim 9 wherein the non-conductive element is made of a material selected from the group consisting of ceramic, glass, and plastic.

15. The protector assembly of claim 9 wherein the solder pellet comprises about 8% solid, non-corrosive, non-conductive rosin flux.

16. A protector assembly comprising:

a gas tube protector element having an electrically conductive terminal;

an electrically conductive end cap adapted for being selectively brought into contact with the terminal to ground the gas tube protector element;

a fusible solder pellet disposed between the end cap and the terminal;

a toroidal non-conductive element disposed between the end cap and the terminal; and an electrically conductive spring clip in contact with the gas tube protector element and the end cap;

wherein the end cap has a raised projection extending outwardly therefrom for engaging the spring clip so that axial forces are applied to the end cap by the spring clip.

17. The protector assembly of claim 16 wherein the solder pellet is further disposed between the non-conductive element and the end cap.

18. The protector assembly of claim 16 wherein the solder pellet is further disposed between the terminal and the non-conductive element.

19. The protector assembly of claim 16 wherein the non-conductive element has a central hole to permit molten solder from the solder pellet to flow therethrough when the protector assembly overheats so that the end cap and the terminal are in electrical contact.

20. The protector assembly of claim 16 wherein the end cap has at least one aperture to permit molten solder from the solder pellet to flow therethrough when the protector assembly overheats.

21. The protector assembly of claim 16 wherein the non-conductive element is made of a material selected from the group consisting of ceramic, glass, and plastic.

22. The protector assembly of claim 16 wherein the solder pellet comprises about 8% solid, non-corrosive, non-conductive rosin flux.

* * * * *